United States Patent
Teramoto

(10) Patent No.: US 7,956,967 B2
(45) Date of Patent: Jun. 7, 2011

(54) LIQUID CRYSTAL DISPLAY DEVICE

(75) Inventor: Kenji Teramoto, Kumamoto (JP)

(73) Assignee: Mitsubishi Electronic Corporation, Tokyo (JP)

(*) Notice: Subject to any disclaimer, the term of this patent is extended or adjusted under 35 U.S.C. 154(b) by 223 days.

(21) Appl. No.: 12/269,430

(22) Filed: Nov. 12, 2008

(65) Prior Publication Data
US 2009/0128733 A1 May 21, 2009

(30) Foreign Application Priority Data
Nov. 20, 2007 (JP) .................................. 2007-300074

(51) Int. Cl.
*G02F 1/1333* (2006.01)
(52) U.S. Cl. ........................................................ 349/122
(58) Field of Classification Search .................. None
See application file for complete search history.

(56) References Cited

U.S. PATENT DOCUMENTS

| | | | |
|---|---|---|---|
| 6,608,748 B1 | 8/2003 | Ogo et al. | |
| 7,522,230 B2 * | 4/2009 | Lee | 349/58 |
| 7,701,530 B2 * | 4/2010 | Lee | 349/58 |
| 2002/0149714 A1 * | 10/2002 | Anderson et al. | 349/59 |
| 2002/0154254 A1 * | 10/2002 | Tasaki et al. | 349/58 |
| 2005/0151894 A1 | 7/2005 | Katsuda et al. | |

FOREIGN PATENT DOCUMENTS

| | | |
|---|---|---|
| JP | 2001-67000 | 3/2001 |
| JP | 2005-202036 | 7/2005 |
| JP | 2005-316042 | 11/2005 |
| JP | 2006-235653 | 9/2006 |
| JP | 2008-102173 | 5/2008 |

* cited by examiner

*Primary Examiner* — Sung H Pak
(74) *Attorney, Agent, or Firm* — Oblon, Spivak, McClelland, Maier & Neustadt, L.L.P.

(57) ABSTRACT

A liquid crystal display device related to the present invention can reduce a stress applied to a crystal liquid panel and prevent unevenness in a display of the liquid crystal panel. This liquid crystal display device includes the crystal liquid panel having an upper substrate and a lower substrate facing each other, a transparent protection plate provided on the upper substrate of the liquid crystal panel, a transparent elastic adhesive material that fills a space between the liquid crystal panel and the transparent protection plate, and a planar light source unit that emits light from the lower substrate side of the liquid crystal panel. The planar light source unit has a frame that includes transparent protection plate supporting portions for supporting end portions of the transparent protection plate from below.

11 Claims, 4 Drawing Sheets

LIQUID CRYSTAL DISPLAY DEVICE

BACKGROUND OF THE INVENTION

1. Field of the Invention

The present invention relates to a liquid crystal display device, and more particularly, to an outdoor liquid crystal display device that has a transparent protection plate provided on a display face thereof.

2. Description of the Background Art

In a liquid crystal display device for outdoor installation, it is necessary to protect a liquid crystal panel from an external impact and water immersion caused by rain. Therefore, a display face of the liquid crystal panel is covered with a transparent protection plate made of resin or glass, and a waterproof finish is provided on a peripheral portion of the transparent protection plate.

Where a transparent protection plate is provided on the display face of the liquid crystal panel, an air space including air bubbles is normally formed between the liquid crystal panel and the transparent protection plate. Due to the air space, external light incident on the display face is reflected by the rear face of the transparent protection plate and the surface of the liquid crystal panel. As a result, visibility becomes lower.

To counter this problem, Japanese Patent Application Laid-Open No. 2005-316042 discloses a liquid crystal display device that has a transparent resin or the like filling a space between the liquid crystal panel and the transparent protection plate, and a liquid crystal display device that has a transparent adhesive material provided in the space.

By those conventional techniques, it is possible to increase the visibility of the display by reducing generation of air bubbles, but air bubbles still exist. Therefore, it is difficult to bond the transparent protection plate onto the liquid crystal panel without air bubbles. Particularly, after a liquid crystal display device is formed by combining a liquid crystal panel, a planar light source unit, and a front frame, it is even more difficult to bond the transparent protection plate onto the liquid crystal panel for the below reasons.

First, by the transparent resin filling technique disclosed in Japanese Patent Application Laid-Open No. 2005-316042, the resin enters a rear face side of the liquid crystal panel through a space between the liquid crystal panel and the front frame holding the liquid crystal panel. When the resin reaches the planar light source unit, unevenness in display is caused. To avoid this problem, a sealing member or the like to prevent the resin from entering the space between the front frame and the liquid crystal panel needs to be formed, and the number of manufacturing procedures increases accordingly.

By a technique of bonding the transparent protection plate onto the liquid crystal panel with the transparent adhesive material, on the other hand, it is necessary to press the display face side of the liquid crystal panel with the front frame, so as to bond the transparent protection plate onto the liquid crystal panel, with no air bubbles entering the space between the liquid crystal panel and the transparent protection plate. However, when a center of the transparent protection plate bonding face of the liquid crystal panel is pressed in a structure having the planar light source unit supporting the peripheral portion of the liquid crystal panel, a problem occurs in that the liquid crystal panel is bent and air bubbles easily enter the bonding face. Also, in a liquid crystal display device having a liquid crystal panel in close contact with a planar light source unit, an optical sheet of the planar light source unit is pressed when the transparent protection plate bonding face of the liquid crystal panel is pressed, and the unevenness in display is caused.

To solve the above problems, there is proposed a liquid crystal display device that is formed by bonding a transparent protection plate to a liquid crystal panel with a transparent elastic adhesive material before the liquid crystal panel, a planar light source unit, and a front frame are incorporated into the structure.

In such a liquid crystal display device, the front frame needs to be incorporated into the structure after the transparent protection plate is bonded to the liquid crystal panel. Therefore, the transparent protection plate is housed in the front frame. In this structure, it is necessary to provide a waterproof finish inside an opening end portion of the front frame. The waterproof finish may be provided by performing the bonding with a caulking material, or applying pressure with an O-ring, or the like. To achieve high productivity, it is preferable to apply pressure with an O-ring.

However, when end portions of the transparent protection plate are pressed by an O-ring inside the opening end portion of the front frame, a stress is transmitted to the liquid crystal panel, since the transparent protection plate is held only by the liquid crystal panel. As a result, the unevenness is caused in the display of the liquid crystal panel.

SUMMARY OF THE INVENTION

The present invention aims to reduce a stress to be applied to a liquid crystal panel, and eliminate unevenness in a display of the liquid display panel.

A liquid crystal display device related to the present invention includes a liquid crystal panel, a transparent protection plate, a transparent elastic adhesive material, and a planar light source unit. The liquid crystal panel has an upper substrate and a lower substrate facing each other. The transparent protection plate is placed on the upper substrate side of the liquid crystal panel. The transparent elastic adhesive material fills a space between the liquid crystal panel and the transparent protection plate. The planar light source unit emits light from the lower substrate side of the liquid crystal panel. The planar light source unit includes a frame that has a supporting portion that supports end portions of the transparent protection plate from below.

As the end portions of the transparent protection plate are supported from below, the stress to be applied to the liquid crystal panel can be reduced. As a result, the unevenness is not caused in the display of the liquid crystal panel.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 8:
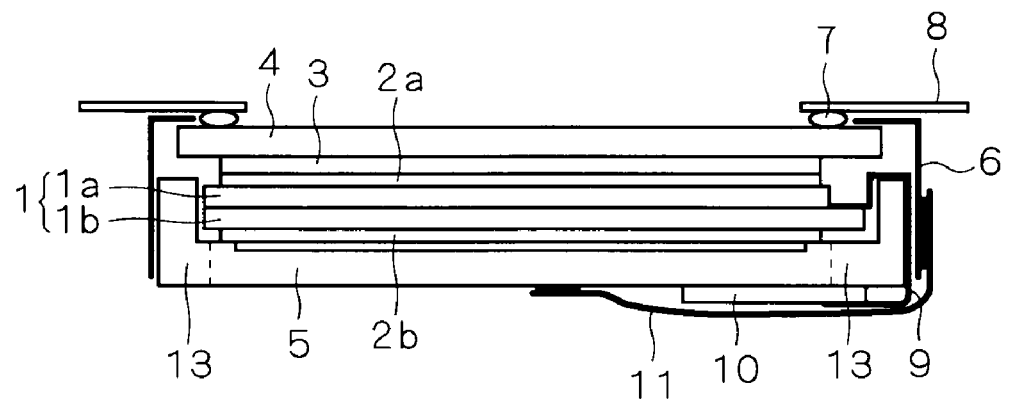
FIG. 8 is a cross-sectional view showing a structure of a liquid crystal display device on which the present invention is premised.

A liquid crystal display device on which the present invention is premised is described before a liquid crystal display device in accordance with a present embodiment is described. FIG. 8 is a cross-sectional view showing a structure of the liquid crystal display device on which the present invention is premised. As shown in FIG. 8, the liquid crystal display device on which the present invention is premised includes a liquid crystal panel 1 having an upper substrate 1a and a lower substrate 1b, an upper polarizing plate 2a, a lower polarizing plate 2b, a transparent elastic adhesive material 3, a transparent protection plate 4, a planar light source unit 5, a front frame 6, an O-ring 7, a bezel 8, a TCP (Tape Carrier Package) 9, a circuit board 10, and a protection film 11. The planar light source unit 5 has a light source inside the dotted line in the figure, and also has a frame 13 extending toward end portions.

The liquid crystal panel 1 has the upper substrate 1a as a surface substrate and the lower substrate 1b as a rear-face substrate. The upper substrate 1a and the lower substrate 1b face each other. The liquid crystal panel 1 has liquid crystal interposed between the upper substrate 1a and the lower substrate 1b. The upper polarizing plate 2a is bonded to the surface of the upper substrate 1a of the liquid crystal panel 1, and the lower polarizing plate 2b is bonded to the surface of the lower substrate 1b.

The transparent protection plate 4 is placed on the upper substrate 1a that is located at the display side of the liquid crystal panel 1. The transparent elastic adhesive material 3 fills a space between the liquid crystal panel 1 and the transparent protection plate 4. The liquid crystal panel 1 is bonded to the transparent protection plate 4 by the transparent elastic adhesive material 3.

Figure 9:
FIG. 9 is a cross-sectional view showing a structure of the liquid crystal display device on which the present invention is premised.

As shown in FIG. 9, the circuit board 10 for driving the liquid crystals is mounted to the liquid crystal panel 1 via the TCP 9. As shown in FIG. 8, the TCP 9 is bent to extend from a space between the transparent protection plate 4 and the frame 13 of the planar light source unit 5 to the rear-face side. With this arrangement, the liquid crystal panel 1 can be provided on the surface of the planar light source unit 5, and the circuit board 10 can be provided on the rear face of the planar light source unit 5. The protection film 11 covers and protects the circuit board 10.

As shown in FIG. 8, each of the O-ring 7 is provided between the transparent protection plate 4 and the bezel 8 in the liquid crystal display device on which the present invention is premised. When the bezel 8 is pressed, the O-ring 7 blocks a space between the transparent protection plate 4 and the bezel 8. A waterproof finish can be thus provided. However, if a pressure is applied to end portions of the transparent protection plate 4 by the O-ring 7 while the transparent protection plate 4 is supported only by the liquid crystal panel 1, a stress is transmitted to the liquid crystal panel 1, and unevenness is caused in the display of the liquid crystal panel 1.

Figure 1:
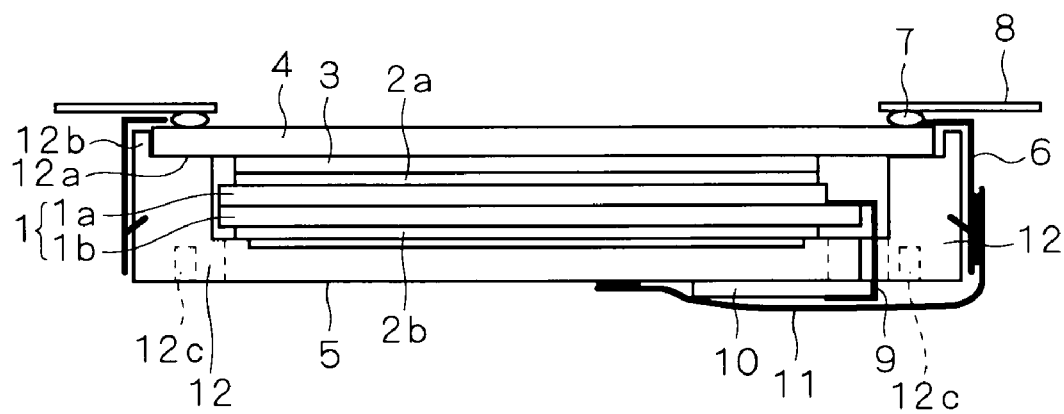
FIG. 1 is a cross-sectional view showing a structure of a liquid crystal display device in accordance with a first embodiment.

A liquid crystal display device in accordance with the present embodiment designed to solve the above problem is now described. FIG. 1 is a cross-sectional view showing a structure of the liquid crystal display device in accordance with the present embodiment. In the liquid crystal display device in accordance with the present embodiment, the same components as those of the above described liquid crystal device are denoted by the same reference symbols as those used for the above described liquid crystal device, and description thereof is not given.

The liquid crystal display device in accordance with the present embodiment includes a liquid crystal panel 1 having an upper substrate 1a and a lower substrate 1b, an upper polarizing plate 2a, a lower polarizing plate 2b, a transparent elastic adhesive material 3, a transparent protection plate 4, a planar light source unit 5, a front frame 6, an O-ring 7, a bezel 8, a TCP (Tape Carrier Package) 9, a circuit board 10, and a protection film 11. The planar light source unit 5 has a light source inside the dotted line in the drawing, and also has a frame 12 extending toward the end portions.

The liquid crystal panel 1 has the upper substrate 1a as a surface substrate and the lower substrate 1b as a rear-face substrate. The upper substrate 1a and the lower substrate 1b face each other. The transparent protection plate 4 is placed on the upper substrate 1a that is the display side of the liquid crystal panel 1. The transparent elastic adhesive material 3 fills the space between the liquid crystal panel 1 and the transparent protection plate 4.

The planar light source unit 5 emits light from a side of the lower substrate 1b of the liquid crystal panel 1. As shown in FIG. 1, the planar light source unit 5 in accordance with the present embodiment has the frame 12 including transparent protection plate supporting portions 12a for supporting the end portions of the transparent protection plate 4 from below.

The lower polarizing plate 2b as a polarizing plate is provided on the surface of the lower substrate 1b of the liquid crystal panel 1. In the present embodiment, the planar light source unit 5 is in contact with a peripheral portion of the lower polarizing plate 2b, as shown in FIG. 1.

In the present embodiment, the frame 12 of the planar light source unit 5 also has a transparent protection plate guide 12b for fixing a horizontal position of the transparent protection plate 4 on the frame 12. Further, in the present embodiment, a space in horizontal direction between the transparent protection plate 4 and the transparent protection plate guide 12b is smaller than a space in horizontal direction between the liquid crystal panel 1 and the planar light source unit 5.

The front frame 6 of the liquid crystal display device in accordance with the present embodiment has an opening, and holds the end portions of the transparent protection plate 4 at a peripheral portion of the opening from above. In the present embodiment, the transparent protection plate supporting portions 12a of the frame 12 of the planar light source unit 5 that support the transparent protection plate 4 from below are provided at such positions as to be exposed through the opening of the front frame 6. In the present embodiment, protrusions are formed on an inner face of the front frame 6, and holes (not shown) are formed in the frame 12 of the planar light source unit 5. The protrusions of the front frame 6 are engaged with the holes of the frame 12 of the planar light source unit 5, so that the front frame 6 is fixed to the frame 12.

Figure 2:
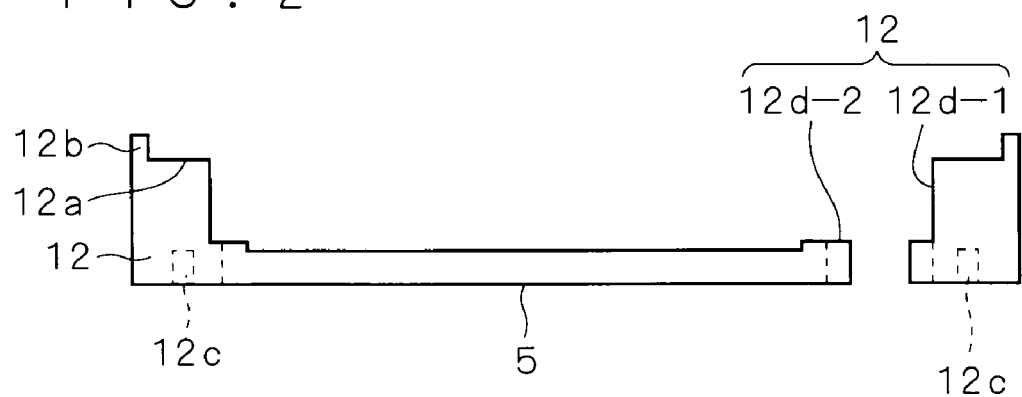
FIGS. 2 to 4 are cross-sectional views showing a structure of the liquid crystal display device in accordance with the first embodiment.

In the present embodiment, the frame of the planar light source unit 5 includes mounting portions 12c for the liquid crystal display device. The mounting portions 12c are located on a side opposite from the transparent protection plate supporting portions 12a. The mounting portions 12c are used when the liquid crystal display device is installed. The frame 12 of the planar light source unit 5 is formed by connecting two or more detachable frame parts. In the present embodiment, the two or more detachable frame parts are two divisional frames 12d-1 and 12d-2, as shown in FIG. 2. The frame 12 is formed by engaging the divisional frames 12d-1 and 12d-2 with each other. When the divisional frame 12d-1 is engaged with the divisional frame 12d-2, a through hole extending from the display side to the rear-face side is formed between the divisional frame 12d-1 and the divisional frame 12d-2. In the present embodiment, the through hole is formed on a left side of a dotted line in the divisional frame 12d-1.

Next, a method of assembling the liquid crystal display device illustrated in FIG. 1 is described. First, the planar light source unit 5 shown in FIG. 2 and a structure shown in FIG. 9 are prepared. Here, the frame 12 of the planar light source unit 5 is divided into the divisional frames 12d-1 and 12d-2, as shown in FIG. 2.

The liquid crystal panel 1 is then placed on the surface of the planar light source unit 5. The TCP 9 is bent, and the circuit board 10 is placed under the rear face of the planar light source unit 5. The divisional frame 12d-1 and the divisional frame 12d-2 are then engaged with each other. At the time of the engagement, the through hole is formed between the divisional frame 12d-1 and the divisional frame 12d-2. The TCP 9 is provided in such a manner as to penetrate through the through hole. The protection film 11 is then bonded to protect the circuit board 10 and prevent any foreign matter from entering a space between the divisional frame 12d-1 and the divisional frame 12d-2.

In the liquid crystal display device in accordance with the present embodiment having the above structure, the transparent protection plate supporting portions 12a of the frame 12 of the planar light source unit 5 support the end portions of the transparent protection plate 4 from below. Accordingly, the pressure applied onto the transparent protection plate 4 by the O-ring 7 can be received at the transparent protection plate supporting portions 12a. In this manner, the stress to be applied to the liquid crystal panel 1 can be reduced. As a result, unevenness in the display of the liquid crystal panel 1 can be prevented. Also, since the transparent elastic adhesive material 3 having elasticity is provided between the transparent protection plate 4 and the liquid crystal panel 1, the stress to be applied to the liquid crystal panel 1 can be further reduced by virtue of the elasticity.

In the present embodiment, the planar light source unit 5 is in contact with the peripheral portion of the lower polarizing plate 2b. Accordingly, a leakage of light through a space between the planar light source unit 5 and the lower polarizing plate 2b can be prevented. Also, any foreign matter can be prevented from entering a space between the planar light source unit 5 and the liquid crystal panel 1.

In the present embodiment, the frame 12 also has the transparent protection plate guide 12b. With this arrangement, a horizontal movement of the transparent protection plate 4 on the frame 12 can be restricted.

In the present embodiment, the space in horizontal direction between the transparent protection plate 4 and the transparent protection plate guide 12b is smaller than the space in horizontal direction between the liquid crystal panel 1 and the planar light source unit 5. With this arrangement, the side face portions of the liquid crystal panel 1 are not brought into contact with the side faces of the liquid crystal panel housing portion of the planar light source unit 5. Accordingly, any foreign matter is not generated in proximity to the display area, and display errors due to foreign matters can be prevented.

In the present embodiment, the transparent protection plate supporting portions 12a of the frame 12 of the planar light source unit 5 are provided at such positions as to be exposed through the opening of the front frame 6. Accordingly, the O-ring 7 can apply pressure onto the surface of the transparent protection plate 4, so as to provide a waterproof finish on the upper side of the transparent protection plate supporting portions 12a.

In the present embodiment, the mounting portions 12c for the liquid crystal display device are provided on the frame 12 of the planar light source unit 5 on a side opposite from the transparent protection plate supporting portions 12a. With this arrangement, the pressure applied by the O-ring 7 can be received at the mounting portions 12c. Accordingly, the stress to be applied to the liquid crystal panel 1 can be further reduced.

In the liquid crystal display device on which the present invention is premised, the TCP 9 is provided through the space between the transparent protection plate 4 and the frame 13 of the planar light source unit 5, so that the circuit board 10 is provided on the rear face of the planar light source unit 5, as shown in FIG. 8. In the present embodiment, on the other hand, the transparent protection plate supporting portions 12a support the end portions of the transparent protection plate 4 from below, and the TCP 9 cannot be provided through a space between the transparent protection plate 4 and the transparent protection plate supporting portions 12a, as shown in FIG. 1. As a result, the circuit board 10 cannot be placed under the rear face of the planar light source unit 5. To counter this problem, the frame 12 of the planar light source unit 5 of the present embodiment is formed by combining the two divisional frames 12d-1 and 12d-2. With this arrangement, the TCP 9 can be provided through the through hole formed between the two divisional frames 12d-1 and 12d-2. Thus, the circuit board 10 can be provided on the rear face of the planar light source unit 5.

Figure 3:
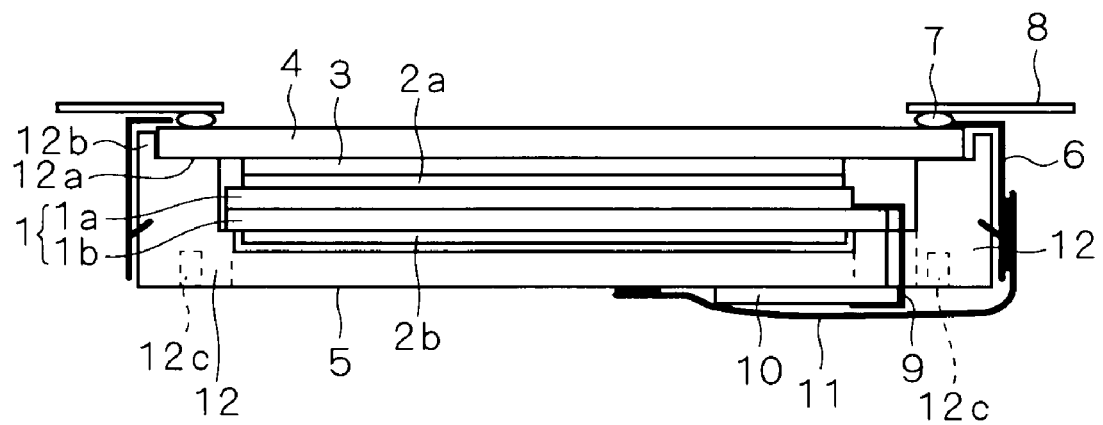
Figure 4:
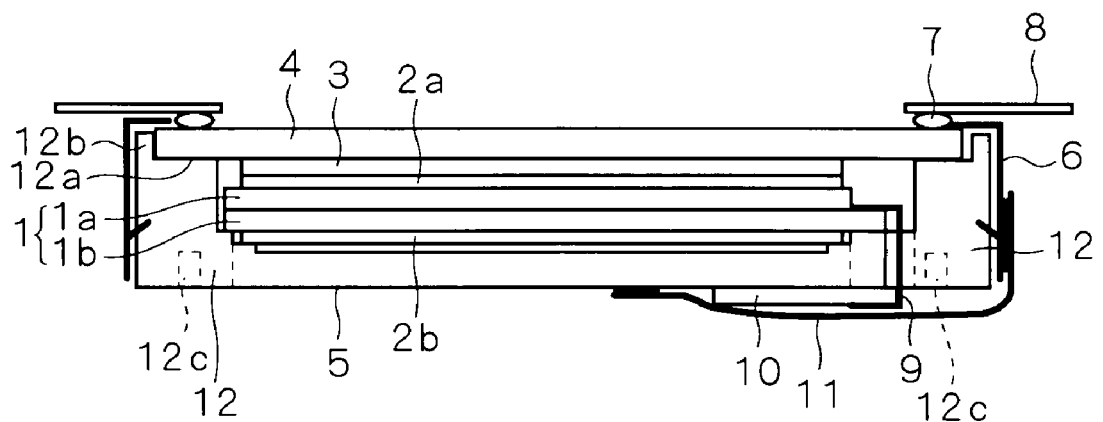

In the present embodiment, the planar light source unit 5 is in contact with the peripheral portion of the lower polarizing plate 2b. However, the present invention is not limited thereto, and the same effects as above can be achieved even if the planar light source unit 5 is in contact with a peripheral portion of the lower substrate 1b of the liquid crystal panel 1, as shown in FIG. 3. The same effects as above can also be achieved even if the planar light source unit 5 is in contact with both the peripheral portion of the lower substrate 1b and the peripheral portion of the lower polarizing plate 2b as shown in FIG. 4.

Second Embodiment

Figure 5:
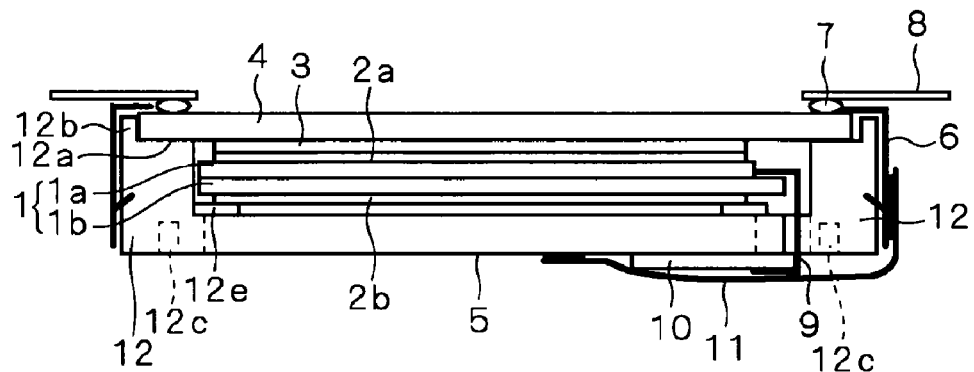
FIGS. 5 to 7 are cross-sectional views showing a structure of a liquid crystal display device in accordance with a second embodiment.
Figure 6:
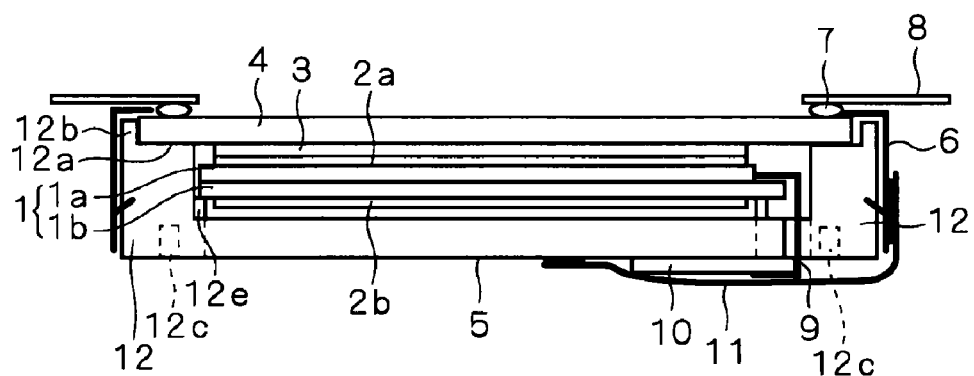
Figure 7:
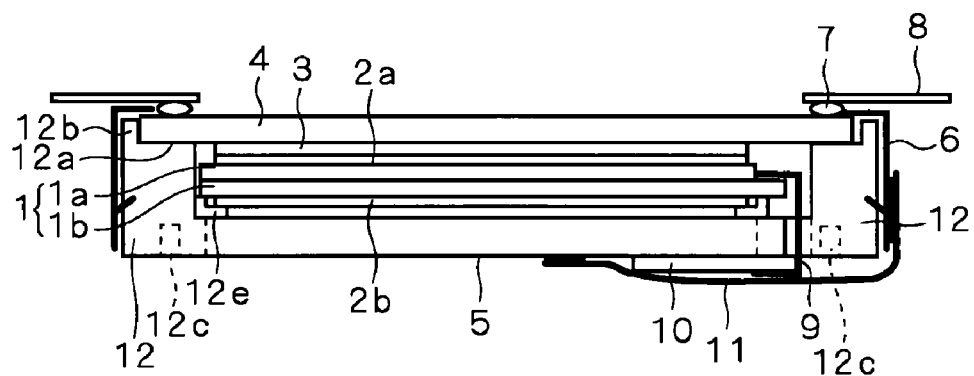

FIG. 5 is a cross-sectional view showing a structure of a liquid crystal display device in accordance with the present embodiment. In the liquid crystal display device in accordance with the present embodiment, same components as those of the first embodiment are denoted by the same reference symbols as those used in the first embodiment, and description thereof is not given. As shown in FIG. 5, the liquid crystal display device in accordance with the present embodiment includes an elastic portion 12e provided in contact with and between the peripheral portion of the lower polarizing plate 2b and the planar light source unit 5.

In the liquid crystal display device in accordance with the present embodiment, the elastic portion 12e is provided between the planar light source unit 5 and the lower polarizing plate 2b placed on the surface of the lower substrate 1b of the liquid crystal panel 1. Accordingly, a greater effect can be achieved in reducing the stress to be applied to the liquid crystal panel 1.

In the present embodiment, the elastic portion 12e is provided between a peripheral portion of the lower polarizing plate 2b and the planar light source unit 5. However, the present invention is not limited thereto, and the effects as above can be achieved even if the elastic portion 12e is provided between the lower substrate 1b of the liquid crystal panel 1 and the planar light source unit 5, as shown in FIG. 6. The same effects as above can also be achieved even if the elastic portion 12e is provided between the planar light source unit 5 and both peripheral portions of the lower substrate 1b and the lower polarizing plate 2b, as shown in FIG. 7.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
    a liquid crystal panel that has an upper substrate and a lower substrate facing each other;
    a transparent protection plate provided on said upper substrate side of said liquid crystal panel;
    a transparent elastic adhesive material that fills a space between said liquid crystal panel and said transparent protection plate; and
    a planar light source unit that emits light from said lower substrate side of said liquid crystal panel, said planar light source unit including a frame that has a supporting portion for supporting an end portion of said transparent protection plate from below.

2. The liquid crystal display device according to claim 1, further comprising:
    a polarizing plate that is provided on said lower substrate surface of said liquid crystal panel, said planar light source unit being in contact with a peripheral portion of said lower substrate and/or a peripheral portion of said polarizing plate.

3. The liquid crystal display device according to claim 1, further comprising:
    a polarizing plate that is provided on said lower substrate surface of said liquid crystal panel; and
    an elastic portion that is provided in contact with and between said planar light source unit and a peripheral portion of said lower substrate and/or a peripheral portion of said polarizing plate.

4. The liquid crystal display device according to claim 1, wherein
    said frame includes a transparent protection plate guide for fixing a horizontal position of said transparent protection plate on said frame.

5. The liquid crystal display device according to claim 4, wherein
    a space in a horizontal direction between said transparent protection plate and said transparent protection plate guide is smaller than a space in the horizontal direction between said liquid crystal panel and said frame.

6. The liquid crystal display device according to claim 1, further comprising:
    a front frame having an opening that holds an end portion of said transparent protection plate at a peripheral portion of said opening from above,
    said supporting portion of said frame supporting said transparent protection plate from below at a position to expose said transparent protection plate through said opening of said front frame.

7. The liquid crystal display device according to claim 1, wherein
    said frame has a mounting portion for mounting said liquid crystal display device,
    said mounting portion being located on an opposite side of said frame from said supporting portion.

8. The liquid crystal display device according to claim 1, wherein said frame of said planar light source unit is formed by connecting at least to detachable frame parts.

9. The liquid crystal display device according to claim 1, further comprising:
    a bezel that presses an O-ring upon the transparent protection plate, the O-ring, when pressed upon the transparent protection plate by the bezel, blocking a space between the transparent protection plate and the bezel and providing a waterproof finish for the liquid crystal display device.

10. The liquid crystal display device according to claim 1, further comprising:
    a tape carrier package that electrically connects said liquid crystal panel and a circuit board, wherein
    said tape carrier package is routed through a through-hole of said frame.

11. The liquid crystal display device according to claim 1, further comprising:
    a front frame including protrusions that are engaged with holes in said frame of said planar light source to fix said front frame to said frame of said planar light source.

* * * * *